(12) United States Patent
Miwa

(10) Patent No.: US 8,237,826 B2
(45) Date of Patent: Aug. 7, 2012

(54) IMAGE SENSING APPARATUS, METHOD FOR CONTROLLING THE SAME, AND PROGRAM

(75) Inventor: Kenji Miwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 12/564,699

(22) Filed: Sep. 22, 2009

(65) Prior Publication Data

US 2010/0079625 A1   Apr. 1, 2010

(30) Foreign Application Priority Data

Sep. 26, 2008   (JP) ................................ 2008-249132

(51) Int. Cl.
*H04N 9/64* (2006.01)
(52) U.S. Cl. ........................................................ 348/247
(58) Field of Classification Search .................... None
See application file for complete search history.

(56) References Cited

U.S. PATENT DOCUMENTS

| | | | | |
|---|---|---|---|---|
| 6,233,364 B1 * | 5/2001 | Krainiouk et al. | ............ | 382/275 |
| 6,940,550 B2 * | 9/2005 | Kitawaki et al. | ............. | 348/246 |
| 7,250,969 B2 * | 7/2007 | Sakurai et al. | ................ | 348/246 |
| 7,365,788 B2 | 4/2008 | Ito | | |
| 7,705,906 B2 * | 4/2010 | Watanabe | ...................... | 348/340 |
| 2004/0169737 A1 * | 9/2004 | Udagawa | .................... | 348/222.1 |
| 2005/0253940 A1 * | 11/2005 | Chiba et al. | ................... | 348/247 |
| 2007/0159551 A1 * | 7/2007 | Kotani | .......................... | 348/349 |
| 2007/0195185 A1 * | 8/2007 | Onuki | ...................... | 348/333.02 |
| 2009/0021607 A1 * | 1/2009 | Takenaka et al. | ........ | 348/231.99 |

FOREIGN PATENT DOCUMENTS

| | | |
|---|---|---|
| JP | 06-105241 | 4/1994 |
| JP | 2004-242158 | 8/2004 |
| WO | WO 2007119495 A2 * | 10/2007 |

* cited by examiner

*Primary Examiner* — Sinh Tran
*Assistant Examiner* — Jason Flohre
(74) *Attorney, Agent, or Firm* — Cowan, Liebowitz & Latman, P.C.

(57) ABSTRACT

An image sensing apparatus includes an image sensor, an optical element disposed in front of the image sensor, and a foreign substance information generation unit that generates foreign substance information for a still image from a foreign substance image obtained by sensing a foreign substance that adheres to the optical element with the image sensor, and generates foreign substance information for a moving image by performing reduction processing on the foreign substance image in accordance with the driving method of the image sensor when shooting a moving image.

4 Claims, 8 Drawing Sheets

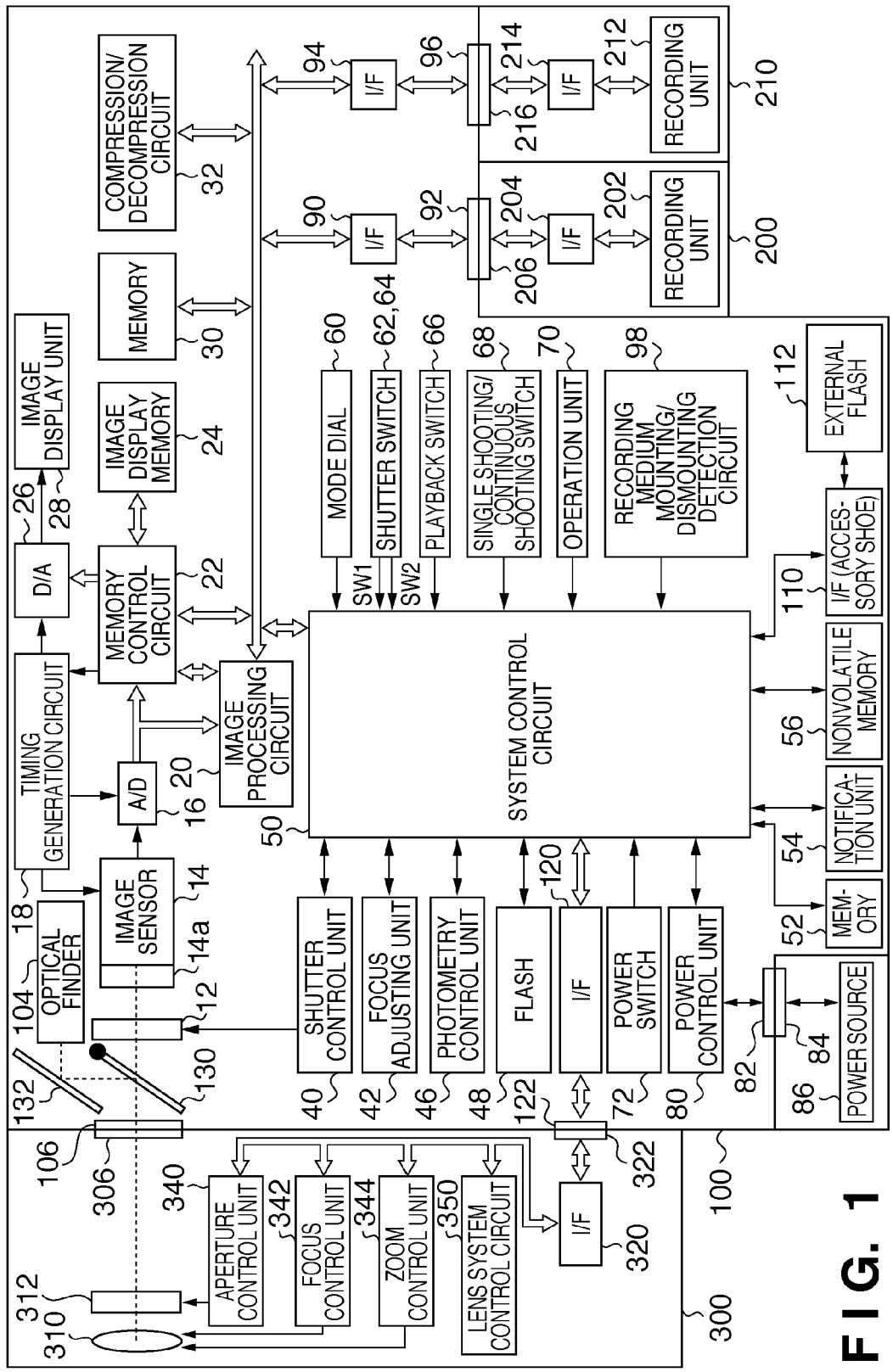
F I G. 1

FIG. 3

| PARAMETERS | SETTINGS |
|---|---|
| APERTURE VALUE | F22 |
| ISO | 400 |
| SHUTTER SPEED | 1/30 |
| PHOTOMETRIC MODE | AVERAGE PHOTOMETRY |
| STROBE EMISSION | PROHIBITED |
| EXPOSURE CORRECTION | INHIBITED |
| AF MODE | MANUAL |
| IMAGE SIZE | LARGE |

FIG. 4

| METHOD | IMAGE QUALITY | PROCESSING SPEED |
|---|---|---|
| NEAREST NEIGHBOR | LOW | HIGH SPEED |
| BILINEAR | MIDDLE | MIDDLE SPEED |
| BICUBIC | HIGH | LOW SPEED |

FIG. 6

| ADDRESS OFFSET (Hex) | CODE (Hex) | MEANING |
|---|---|---|
| +00 | FF | Prefix |
| +01 | E0 | |
| +02 | | F VALUE (NUMERATOR) |
| +04 | | F VALUE (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETER IN DUST REGION $D_1$<br>   RADIUS (2 BYTES)<br>    x COORDINATE IN CENTER (2 BYTES)<br>    y COORDINATE IN CENTER (2 BYTES) |
| | | PARAMETERS OF DUST REGION $D_2$ |
| | | . . . |
| | | PARAMETERS OF DUST REGION $D_n$ |

IMAGE SENSING APPARATUS, METHOD FOR CONTROLLING THE SAME, AND PROGRAM

BACKGROUND OF THE INVENTION

1. Field of the Invention

The present invention relates to technology for suppressing deterioration in image quality due to a foreign substance adhering to the surface of an optical low-pass filter or the like disposed in front of an image sensor in an image sensing apparatus that uses an image sensor such as a CCD sensor or a CMOS sensor, and particularly relates to technology for generating foreign substance information.

2. Description of the Related Art

With an interchangeable-lens digital camera, dirt or the like floating in the air may enter into the camera body when the lens is removed from the camera body. In addition, various mechanical units that operate mechanically, such as shutter mechanisms and the like, are disposed inside the camera; thus, there are also cases in which, for example, metal fragments and other such dust is created through the operation of those mechanical units.

When such foreign substances such as dust or dirt adhere to the surface of an optical element, such as an optical low-pass filter, disposed in front of the image sensor of which the sensing unit of the digital camera is configured, the foreign substance appears in shot images as a shadow, which degrades the quality of the shot image.

In order to solve such a problem, a method for correcting the pixel in which the foreign substance appears using signals from pixels surrounding that pixel or the like is conceivable. As such pixel-correction technology, Japanese Patent Laid-Open No. H6-105241, for example, proposes an image defect correction method for correcting pixel defects in an image sensor. Also, Japanese Patent Laid-Open No. 2004-242158 proposes changing the extensions of image files shot in a dust acquisition mode to be different from the extensions of normal images in order to simplify settings for information on the position of the pixel defect. As a result, dust information is automatically determined by a PC (personal computer), and the image to be corrected is then corrected using that information.

In recent years, technology for encoding moving image information at a high compression rate and high quality has been proposed and become widespread in recent years, with the aim of handling such moving image information as digital data for storage and transmission.

The Motion JPEG system encodes data by applying still image encoding (for example, JPEG (Joint Photographic Coding Experts Group) encoding) to each frame. Although JPEG encoding is an encoding system used primarily for still images, products that apply such encoding to moving images through high-speed processing have also emerged.

Meanwhile, the H.264 (MPEG 4-Part10 AVC) is an encoding system that aims at even higher compression rates and image quality. Compared to conventional encoding systems such as MPEG 2 and MPEG 4, it is known that although the H.264 requires greater amounts of computations for encoding and decoding, the H.264 is also capable of realizing even higher encoding efficiency (see ISO/IEC 14496-10, "Advanced Video").

Compact digital cameras capable of recording moving images using such encoding systems have also been developed and commercialized, and users can easily view images using these apparatuses, or using personal computers, DVD players, or the like.

Under such circumstances, in recent years, there is greater demand for recording moving images at higher resolutions and with more pixels not only with compact digital cameras, but with interchangeable-lens digital cameras as well. However, as already described, since dust adheres to the surface of the image sensor in interchangeable-lens digital cameras due to various factors, there is the possibility that, if a moving image is recorded in that state, dust will always be displayed at the same position while playing back the moving image.

In conventional dust removal methods for interchangeable-lens digital cameras, foreign substance information necessary for removing dust (for example, information regarding the position and the size of the dust) and image data is recorded, the image data is imported into a personal computer or the like later, and the dust is then removed through image processing. Since conventional foreign substance information is applied to image data including still images, such information is acquired through the same shooting operation as that of still image shooting; thus, the information is not foreign substance information generated with moving image recording taken into account.

However, unlike still image shooting, when recording a moving image, control may be performed so as to prioritize processing speed for shooting and recording processing in order to achieve the prescribed frame rate, the maximum moving image recording time, and so on.

For example, with still image shooting, the image data read out from the image sensor is always read out at the maximum size, even when recording images of different sizes. Then, an image processing circuit performs reduction processing on the read-out image data, reducing the data to the size at which the image is to be recorded, after which a recording unit records the data.

However, it takes extremely long to perform processing for reading out image data at the maximum size from the image sensor, and it is difficult to read out image data at the maximum size when recording moving images. Thus, control is performed so as to read out image data that has been reduced at the point in time when the image data is read out from image sensor, in order to reduce the processing time.

Furthermore, the method of the reduction processing is determined when the image processing circuit performs the reduction processing on the image data that was read out, taking the processing time into account.

As described above, the image sensor and the image processing circuit are controlled in a different manner when recording moving images than when shooting still images; thus, the number of dust particles that remain in the recorded data, the size thereof, the shape thereof, and so on are different than when shooting still images.

SUMMARY OF THE INVENTION

The present invention enables generation of appropriate foreign substance information when shooting and recording moving images as well as still images.

According to a first aspect of the present invention, an image sensing apparatus includes an image sensor, an optical element disposed in front of the image sensor, and a foreign substance information generation unit that generates foreign substance information for a still image from a foreign substance image obtained by sensing a foreign substance that adheres to the optical element with the image sensor, and generates foreign substance information for a moving image by performing reduction processing on the foreign substance image in accordance with the driving method of the image sensor when shooting a moving image.

Furthermore, according to a second aspect of the present invention, an image sensing apparatus includes an image sensor, an image processing unit that processes an image signal based on an output signal from the image sensor, an optical element disposed in front of the image sensor, and a foreign substance information generation unit that generates foreign substance information for a still image from a foreign substance image obtained by sensing a foreign substance that adheres to the optical element with the image sensor, and generates foreign substance information for a moving image by performing reduction processing on the foreign substance image in accordance with the image processing method performed by the image processing unit when shooting a moving image.

Furthermore, according to a third aspect of the present invention, a method for controlling an image sensing apparatus including an image sensor and an optical element disposed in front of the image sensor is a method including the steps of generating foreign substance information for a still image from a foreign substance image obtained by sensing a foreign substance that adheres to the optical element with the image sensor, and generating foreign substance information for a moving image by performing reduction processing on the foreign substance image in accordance with the driving method of the image sensor when shooting a moving image.

Furthermore, according to a fourth aspect of the present invention, a method for controlling an image sensing apparatus including an image sensor, an image processing unit that processes an image signal based on an output signal from the image sensor, and an optical element disposed in front of the image sensor is a method including the steps of generating foreign substance information for a still image from a foreign substance image obtained by sensing a foreign substance that adheres to the optical element with the image sensor, and generating foreign substance information for a moving image by performing reduction processing on the foreign substance image in accordance with the image processing method performed by the image processing unit when shooting a moving image.

Further features of the present invention will become apparent from the following description of exemplary embodiments with reference to the attached drawings.

BRIEF DESCRIPTION OF THE DRAWINGS

FIG. 1 is a block diagram showing the configuration of an image sensing apparatus according to an embodiment of the present invention.

FIG. 3 is a list of parameters set when dust information is acquired in an embodiment of the present invention.

FIG. 4 is a diagram showing methods for enlargement/reduction processing and features thereof in an embodiment of the present invention.

FIG. 6 is a diagram showing the configuration of a dust information profile.

DESCRIPTION OF THE EMBODIMENTS

Figure 2:
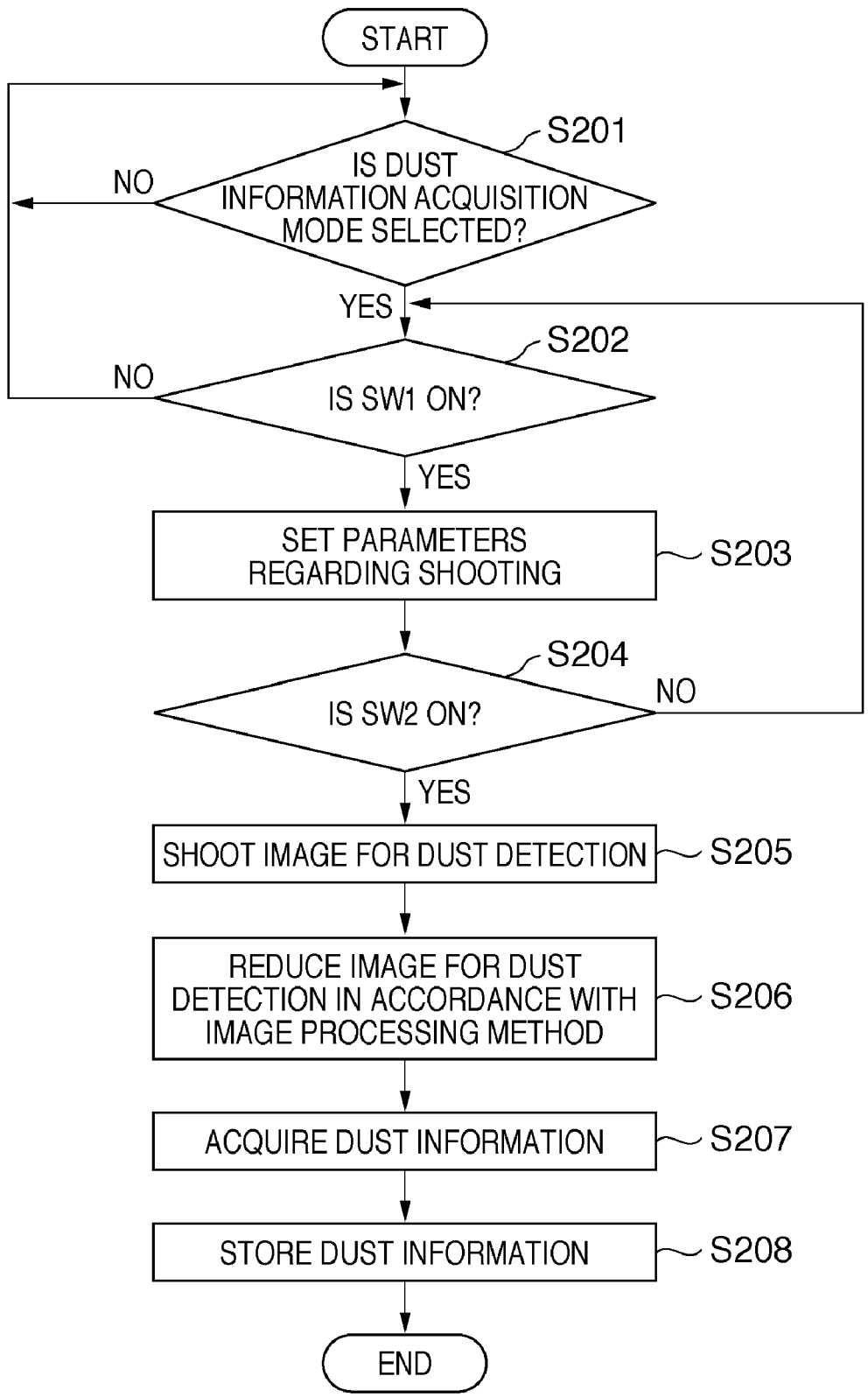
FIG. 2 is a flowchart showing processing performed by a digital camera when dust information is acquired in an embodiment of the present invention.

Hereinafter, an embodiment of the present invention will be described in detail with reference to the drawings.

FIG. 1 is a block diagram showing the configuration of an image sensing apparatus having an image processing function in an embodiment of the present invention. The present embodiment will be described using a digital single-lens reflex camera whose lens is interchangeable as an example of the image sensing apparatus. Note that the present invention can also be applied when using a digital video camera or the like with an interchangeable lens as the image sensing apparatus.

As shown in FIG. 1, the image sensing apparatus of the present embodiment is configured primarily of a camera body 100 and an interchangeable-lens-type lens unit 300.

In the lens unit 300, 310 denotes a sensing lens configured of a plurality of lenses, 312 denotes an aperture, and 306 denotes a lens mount that mechanically joins the lens unit 300 to the camera body 100. The lens mount 306 includes various functions for electrically connecting the lens unit 300 to the camera body 100. 320 denotes an interface for connecting the lens unit 300 to the camera body 100 in the lens mount 306, and 322 denotes a connector that electrically connects the lens unit 300 to the camera body 100.

The connector 322 exchanges control signals, status signals, data signals, and the like between the camera body 100 and the lens unit 300, and also includes a function for being supplied with currents at various voltages. Also, the connector 322 may be configured so as to perform communication through optical communications, audio communications, and the like rather than electrical communications.

340 denotes an aperture control unit that controls the aperture 312 in cooperation with a shutter control unit 40 that controls a shutter 12 of the camera body 100 (described later), based on photometric information from a photometry control unit 46. 342 denotes a focus control unit that controls the focusing of the sensing lens 310, and 344 denotes a zoom control unit that controls the zooming of the image sensing lens 310.

350 denotes a lens system control circuit that controls the overall lens unit 300. The lens system control circuit 350 includes a memory for storing constants, variables, programs, and the like for operations. Further, the lens system control circuit 350 also includes a nonvolatile memory for holding identification information such as a number unique to the lens unit 300, management information, function information such as an open aperture value, a minimum aperture value, and the focal length, and current and past setting values.

The configuration of the camera body 100 shall be described next.

106 denotes a lens mount that mechanically joins the camera body 100 and the lens unit 300, and 130 and 132 denote mirrors that direct light beams that have entered the sensing lens 310 to an optical finder 104 using a single-lens reflex system. Note that the mirror 130 may be either a quick-return mirror or a half mirror. 12 denotes a focal-plane shutter, and 14 denotes an image sensor, configured of a CCD sensor, a CMOS sensor, or the like, that performs photoelectric conversion on a subject image. Note that an optical element 14a such as an optical low-pass filter is disposed in front of the image sensor 14, and foreign substances such as dust that adheres to the surface of the optical element 14a appear in images generated by the image sensor 14, which causes deterioration in the image quality. The present embodiment relates to technology for suppressing such deterioration in image quality.

Light beams entering the sensing lens 310 are directed via the aperture 312, serving as a light quantity limiting unit, the lens mounts 306 and 106, the mirror 130, and the shutter 12 using a single-lens reflex system, forming an optical image on the image sensor 14.

16 denotes an A/D converter that converts analog signals (output signals) output from the image sensor 14 into digital signals. 18 denotes a timing generation circuit that supplies clock signals and control signals to the image sensor 14, the A/D converter 16, and a D/A converter 26 respectively, and is controlled by a memory control circuit 22 and a system control circuit 50.

20 denotes an image processing circuit that performs predetermined pixel interpolation processing and color conversion processing on data from the A/D converter 16 or on data from the memory control circuit 22. The image processing circuit 20 also performs predetermined computational processing using image data output from the A/D converter 16 as necessary. Based on the obtained computation result, the system control circuit 50 can perform a TTL (through-the-lens) autofocus (AF) process, auto exposure (AE) process, and electronic flash pre-emission (EF) process for controlling the shutter control unit 40 and a focus adjustment unit 42. Furthermore, the image processing circuit 20 performs predetermined computational processing using image data output from the A/D converter 16, and also performs a TTL auto white balance (AWB) process based on the obtained computation result.

Note that the focus adjustment unit 42 and the photometry control unit 46 are provided independently in the example shown in FIG. 1 in the present embodiment. Thus, it is possible to adopt a configuration in which processes such as AF processes, AE processes, and EF processes are performed using the focus adjustment unit 42 and the photometry control unit 46, and processes such as AF processes, AE processes, and EF processes are not performed using the image processing circuit 20. Moreover, it is possible to adopt a configuration in which processes such as AF processes, AE processes, and EF processes are performed using the focus adjustment unit 42 and the photometry control unit 46 and, furthermore, processes such as AF processes, AE processes, and EF processes are performed using the image processing circuit 20.

22 denotes the memory control circuit controlling the A/D converter 16, the timing generation circuit 18, the image processing circuit 20, an image display memory 24, the D/A converter 26, a memory 30, and a compression/decompression circuit 32. Image data output from the A/D converter 16 is written into the image display memory 24 or the memory 30 via the image processing circuit 20 and the memory control circuit 22, or only via the memory control circuit 22.

24 denotes the image display memory, 26 denotes the D/A converter, and 28 denotes an image display unit configured of a TFT LCD or the like; image data to be displayed that has been written into the image display memory 24 is displayed in the image display unit 28 via the D/A converter 26. An electronic viewfinder (EFV) function can be realized by sequentially displaying captured image data in the image display unit 28. Further, the image display unit 28 can have its display turned on/off freely based on an instruction from the system control circuit 50, and the power consumption of the camera body 100 can be greatly reduced when the display is turned off.

30 denotes the memory for storing still images or moving images that are shot, provided with a storage capacity sufficient for storing a predetermined number of still images or a predetermined amount of moving images. Thus, it is possible to write a large number of images to the memory 30 at high speeds, even in the case of sequential shooting in which a plurality of still images are sequentially shot, or in the case of panorama shooting. The memory 30 is also used as a frame buffer for images to be sequentially written at a predetermined rate when shooting moving images. Furthermore, the memory 30 can also be used as a work area for the system control circuit 50.

32 denotes the compression/decompression circuit, which compresses and decompresses image data using a known compression method. The compression/decompression circuit 32 loads images stored in the memory 30 and performs compression processing or decompression processing thereon, and writes the processed data back into the memory 30. Further, the compression/decompression circuit 32 also has functions for encoding moving image data in a predetermined format or decompressing the encoded data in the predetermined format into a moving image signal.

40 denotes the shutter control unit that controls the shutter 12 in cooperation with the aperture control unit 340 that controls the aperture 312 based on photometric information from the photometry control unit 46. 42 denotes the focus adjustment unit for performing an AF (autofocus) process. By causing light beams entering the sensing lens 310 in the lens unit 300 to enter using a single-lens reflex system via the aperture 312, the lens mounts 306 and 106, the mirror 130, and a focus-adjusting sub mirror (not shown), the focus adjustment unit measures the focusing state of an image formed as an optical image.

46 denotes the photometry control unit for performing an AE (auto exposure) process. By causing light beams entering the sensing lens 310 in the lens unit 300 to enter using a single-lens reflex system via the aperture 312, the lens mounts 306 and 106, the mirror 130, and a photometry sub mirror (not shown), the photometry control unit measures the exposure state of an image formed as an optical image. 48 denotes a flash that also has a function for projecting supplemental AF light as well as a flash light control function. The photometry control unit 46 has a function for performing an EF (Electronic Flash pre-emission) process in cooperation with the flash 48.

AF control may be performed using the measurement result obtained by the focus adjustment unit 42 and a computation result obtained by the image processing circuit 20 computing image data from the A/D converter 16. Furthermore, exposure control may be performed using a measurement result obtained by the photometry control unit 46 and a computation result obtained by the image processing circuit 20 computing image data from the A/D converter 16.

50 denotes the system control circuit, which controls the overall camera body 100, and contains a known CPU and the like. 52 denotes a memory that stores constants, variables, programs, and the like for operations of the system control circuit 50.

54 denotes a notification unit for communicating operational states, messages, and the like to the exterior using text, images, audio, and the like in accordance with execution of programs in the system control circuit 50. A display unit for visual display using an LCD, an LED, or the like, a sound-emitting device that notifies using audio, and so on are used for the notification unit 54, and the notification unit 54 is configured of one or a combination of these. Particularly, in the case of the display unit, the notification unit is provided in a single or multiple easily-recognizable positions in the vicinity of an operation unit 70 of the camera body 100. Further, some of the functions of the notification unit 54 are provided in the optical finder 104.

Among the items displayed via the notification unit 54, the following are the items displayed in the image display unit 28, such as an LCD: first, a display regarding the shooting mode, such as a single shooting/continuous shooting display, and a self-timer display; a display regarding records of a compression rate display, a display showing the number of recorded pixels, a display showing the number of recorded images, and a display showing the remaining number of images that can be shot; a display regarding shooting conditions, such as a shutter speed display, an aperture value display, an exposure correction display, a light control correction display, an external flash emitting amount display, and a red-eye reduction display; in addition, a macro shooting display, a buzzer setting display, a display showing the remaining battery power, an error display, a multi-digit number information display, and a display showing the mounting state of a recording medium 200 and a PC 210; and, furthermore, a display showing the mounting state of the lens unit 300, a display showing the operation of a communication I/F, a date and time display, a display showing a connection state to an external computer, and the like.

Among the items displayed via the notification unit 54, the following are example items displayed in the optical finder 104: a focus display, a shooting preparation completion display, a motion blur warning display, a flash charge display, a flash charge completion display, a shutter speed display, an aperture value display, an exposure correction display, a recording medium writing operation display, and so on.

56 denotes a nonvolatile memory that stores programs, described later, and that can be electrically erased and recorded to, such as, for example, an EEPROM.

60, 62, 64, 66, 68, and 70 are operation means for inputting various operation instructions for the system control circuit 50, and configured of one or a combination of switches, dials, a touch panel, a pointing function that uses eye movement detection, a voice recognition device, or the like.

Here, the operation means shall be described in detail.

60 denotes a mode dial switch with which functional modes, such as an automatic shooting mode, a program shooting mode, a shutter speed priority shooting mode, an aperture priority shooting mode, a manual shooting mode, and a focus depth priority shooting mode, can be switched between and set. Other than the above modes, functional modes, such as a portrait shooting mode, a landscape shooting mode, a close-up shooting mode, a sport shooting mode, a night view shooting mode, and a panoramic shooting mode, can be switched between and set.

62 denotes a shutter switch SW1 that is turned on partway through the operation of a shutter button (not shown) (for example, when the button is pressed halfway), and that instructs the start of operations such as an AF process, an AE process, an AWB process, and an EF process.

64 denotes a shutter switch SW2 that is turned on when an operation of the shutter button (not shown) is completed (for example, the button is fully pressed), and that instructs the start of a series of processes including an exposure process, a development process, and a recording process. First, in the exposure process, signals read out from the image sensor 14 are written into the memory 30 via the A/D converter 16 and the memory control circuit 22 and, further, the development process is performed using computation performed by the image processing circuit 20 and the memory control circuit 22. Furthermore, in the recording process, image data is read out from the memory 30, compressed by the compression/decompression circuit 32, and written into or transmitted to the recording medium 200 or the PC 210.

66 denotes a playback switch that instructs the start of a playback operation in which images shot in the shooting mode state are read out from the memory 30, the recording medium 200, or the PC 210, and displayed in the image display unit 28. In addition, functional modes, such as a playback mode, a multi screen playback/erasing mode, and a PC connection mode can be set with the playback switch 66.

68 denotes a single shooting/continuous shooting switch with which a single shooting mode, where the camera enters a standby state after shooting one picture when the shutter switch SW2 is pressed, and a continuous shooting mode, where the camera continuously shoots while the shutter switch SW2 (64) is being pressed, can be set.

70 denotes an operation unit configured of various buttons, a touch panel, and the like. The operation unit 70 includes, for example, a live view start/stop button, a moving image recording start/stop button, a menu button, a set button, a multi screen playback page break button, a flash setting button, and a single shooting/continuous shooting/self-timer switch button, a menu shift + (plus) button, and a menu shift – (minus) button. Furthermore, the operation unit 70 also includes a playback image shift + (plus) button, a playback image shift – (minus) button, a shooting image quality selection button, an exposure correction button, a light control correction button, an external flash emitting amount setting button, a date/time setting button, and the like. Note that the functions of the plus button and minus button described above can be implemented by providing a rotation dial switch, which makes it possible to select numerical values or functions more smoothly.

Furthermore, the operation unit 70 includes an image display on/off switch for turning the image display unit 28 on or off and a quick review on/off switch with which a quick review function, for automatically playing back the shot image data immediately after the shooting, is set. The operation unit 70 also includes a compression mode switch that is a switch for selecting a JPEG compression rate, or selecting a RAW mode, in which signals from the image sensor are digitized and recorded in the recording medium as-is. The operation unit 70 also includes an AF mode setting switch or the like with which a one-shot AF mode and a servo AF mode can be set. In the one-shot AF mode, the pressing of the shutter switch SW1 (62) starts an autofocus operation, and once focus is achieved, that focusing state is maintained. In the servo AF mode, while the shutter switch SW1 (62) is being pressed, the autofocus operation is performed continuously. Moreover, the operation unit 70 includes a setting switch with which a dust information acquisition mode, for acquiring dust information by shooting an image for dust detection (a foreign substance image), described later, can be set.

72 denotes a power switch with which a power on mode and a power off mode of the camera body 100 can be switched between and set. Furthermore, the power on settings and a power off settings of the various peripheral apparatuses connected to the camera body 100, such as the lens unit 300, an external flash 112, the recording medium 200, and the PC 210, can also be switched between and set.

80 denotes a power control unit configured of a battery detection circuit, a DC-DC converter, a switch circuit that switches blocks to be powered, and the like. The power control unit 80 detects whether or not a battery is loaded, the type of battery, and remaining battery power, controls the DC-DC converter based on the detection result and instructions from the system control circuit 50, and supplies the necessary voltage for the necessary period of time to units including the recording medium.

82 and 84 denote connectors, and 86 denotes a power source unit configured of primary batteries such as alkaline batteries and lithium batteries; secondary batteries such as NiCd batteries, NiMH batteries, Li-ion batteries, and Li polymer batteries; an AC adaptor; and the like.

90 and 94 denote interfaces with a recording medium, such as a memory card or a hard disk, and a PC, and 92 and 96 denote connectors that connect to the recording medium, such as a memory card or a hard disk, and the PC. 98 denotes a recording medium mounting detection circuit that detects whether or not the recording medium 200 or the PC 210 is mounted to the connector 92 and/or the connector 96.

Note that although the present embodiment is described as having two interface/connector systems for mounting recording media, a single interface/connector system or multiple interface/connector systems for mounting recording media may be provided, and the configuration may include any number of such systems. The configuration may furthermore include combinations of interfaces and connectors of differing standards.

It is possible to use interfaces and connectors that comply with various storage media standards. Examples of such interfaces and connectors include PCMCIA (Personal Computer Memory Card International Association) cards, CF (CompactFlash®) cards, SD cards, and the like. When interfaces and connectors that comply with standards, such as PCMCIA cards or CF cards, are used for the interfaces 90 and 94 and the connectors 92 and 96, various communication cards can be connected thereto. Communication cards include LAN cards, modem cards, USB (Universal Serial Bus) cards, and IEEE (Institute of Electrical and Electronic Engineers) 1394 cards. Such communication cards also include P1284 cards, SCSI (Small Computer System Interface) cards, PHS, and the like. Connecting these various communication cards makes it possible to exchange image data and management information attached to the image data with peripheral devices such as other computers, printers, and the like.

104 denotes the optical finder that can direct light beams entering the sensing lens 310 via the aperture 312, the lens mounts 306 and 106, and the mirrors 130 and 132 using a single-lens reflex system, form an image as an optical image, and display the image. This enables shooting using only the optical finder rather than using the electronic viewfinder function of the image display unit 28. Some of the functions of the notification unit 54, such as, for example, the focusing state, motion blur warnings, flash charge, the shutter speed, the aperture value, and exposure correction are displayed in the optical viewfinder 104.

112 denotes the external flash apparatus mounted via an accessory shoe 110.

120 denotes an interface for connecting the camera body 100 to the lens unit 300 in the lens mount 106.

122 denotes a connector that electrically connects the camera body 100 to the lens unit 300. A lens mounting detection unit (not shown) detects whether or not the lens unit 300 is mounted to the lens mount 106 and the connector 122. The connector 122 exchanges control signals, status signals, data signals, and the like between the camera body 100 and the lens unit 300, and also includes a function for supplying currents at various voltages.

Various pieces of optical information (aperture, zoom position, pupil distance, focal distance, and the like) regarding the lens unit 300 that are communicated via the connector 122 are stored in the nonvolatile memory 56 of the camera body 100. In some cases, the camera requests communication, and in other cases, the lens communicates such information every time the information is updated.

The connector 122 may be configured so as to perform communication through optical communications and audio communications rather than electrical communications.

200 denotes the recording medium such as a memory card or a hard disk. The recording medium 200 includes a recording unit 202 configured of a semiconductor memory, a magnetic disk, or the like, an interface 204 with the camera body 100, and a connector 206 that connects to the camera body 100.

A memory card such as a PCMCIA card, a CompactFlash®, a hard disk, and the like can be used for the recording medium 200. The recording medium 200 may of course be configured of a micro DAT, a magneto-optical disk, an optical disk such as a CD-R or a CD-RW, a phase-change optical disk such as a DVD, or the like instead.

210 denotes the PC, which includes a recording unit 212 configured of a magnetic disk (HD) or the like, an interface 214 with the camera body 100, and a connector 216 that connects to the camera body 100. Although USB, IEEE 1394, and the like can be used for the interface 94, the standard is not particularly limited.

Next, a method for acquiring dust information for still image shooting, which is information regarding the position or the size of dust on the optical element 14a such as a low-pass filter or a cover glass disposed in front of the image sensor, will be described, assuming an image sensing apparatus having the configuration described above.

In the present embodiment, an image for dust detection (a foreign substance image) for obtaining dust information (generating foreign substance information) that is information regarding the position at which dust (a foreign substance) adheres, the size thereof, and the like, is shot, dust data is extracted, and dust data is generated. Here, although the image for dust detection is preferably an image obtained by shooting a plane having the highest possible luminance uniformity, it is also preferable that shooting can be easily performed in a familiar place and, thus, absolute uniformity is not required. For example, it is assumed that a blue sky or a white wall is shot.

FIG. 2 is a flowchart showing processing performed by a digital camera when dust information is acquired in the present embodiment.

First, in step S201, it is determined whether or not the dust information acquisition mode is selected by the operation unit 70. The determination in step S201 is repeated until the dust information acquisition mode is selected, and when the dust information acquisition mode is selected, the processing proceeds to step S202, where it is determined whether or not the shutter switch SW1 (62) is turned on. If the shutter switch SW1 is off, processing returns to step S201, and the above processing is repeated.

On the other hand, if the shutter switch SW1 is on, the aperture, ISO value, shutter speed, and other parameters regarding shooting are set in step S203. The parameters set here are shown in FIG. 3. The setting is made such that the aperture is reduced to an aperture of F22 or the like. Shooting may be performed in a state in which the aperture is reduced as much as possible within the range that can be set in the lens unit 300 to be connected to the lens mount 106. The reason the aperture is reduced in this way is that dust normally adheres not to the surface of the image sensor 14, but to the protective glass that protects the image sensor 14 or to the optical element 14a, such as an optical filter, disposed between the image sensor and the subject; accordingly, the image formation conditions differ depending on the aperture value of the lens unit 300. Consequently, when the aperture is close to the open value, the dust image appears blurred, and an appropriate image for dust detection cannot be acquired; thus, it is preferable to shoot in a state in which the aperture is reduced as much as possible.

Returning back to the description of the flowchart in FIG. 2, a shooter has by this time pointed the image sensing apparatus at a plane with as uniform a luminance as possible, such as a white wall, and operated the shutter switch SW2 (64).

In step S204, it is determined whether or not the shutter switch SW2 (64) is turned on. When the shutter switch SW2 is off, the processing returns to step S202, and determination is performed on the shutter switch SW1 (62). When the shutter switch SW2 is on, the processing proceeds to step S205. In step S205, the image for dust detection is shot (a plane with uniform luminance is shot), and image data is captured in the memory 30.

Next, in step S206, processing for reducing image data stored in the memory 30 in accordance with image processing is performed. The shot image is a large image having the maximum resolution for an image that can be shot by a digital camera of the present embodiment. When the size of an image to be actually recorded is not large, but medium or small, the image sensor operates in the same manner as when recording an image whose size is large, whereupon the image processing circuit performs processing for reducing image data into a medium or small size so that the image data is converted into the size at which the image is to be recorded. Thus, processing for reducing the image data for dust detection stored in the memory 30 is performed in accordance with the size at which the image is to be recorded. The shooter carefully evaluates images obtained by still image shooting to confirm the focus, image quality, and the like. Also, it is possible to allocate a long time for image processing. Therefore, a reduction method with the image quality taken into account is used as an image processing method.

The nearest neighbor method, the bilinear method, the bicubic method, and the like are well-known as image processing methods for enlargement/reduction, and have the features summarized in FIG. 4. When shooting still images, since it is possible to take time for image processing, the bicubic method, which provides the best image quality, is often used. By performing reduction processing with this method, data including an image for dust detection on which reduction processing has been performed becomes a dust information acquisition image with high accuracy for still image shooting.

Next, in step S207, dust information is acquired from the image data stored in the memory 30.

Here, acquisition of dust information shall be described. Specifically, the position (coordinates) and the size of a dust region are obtained from the shot image for dust detection. First, the region of the shot image for dust detection is divided into a plurality of blocks, a maximum luminance Lmax and an average luminance Lave in a block are calculated, and a threshold value T1 in a block is calculated using the following equation.

$$T1 = Lave \times 0.6 + Lmax \times 0.4$$

Next, since the luminance of a pixel to which dust adheres is lower than the luminance of surrounding pixels, a pixel whose luminance is less than the threshold value T1 is determined to be a dust pixel, and each isolated region configured by dust pixels is one dust region di (i=0, 1, and so on up to n).

Figure 5:
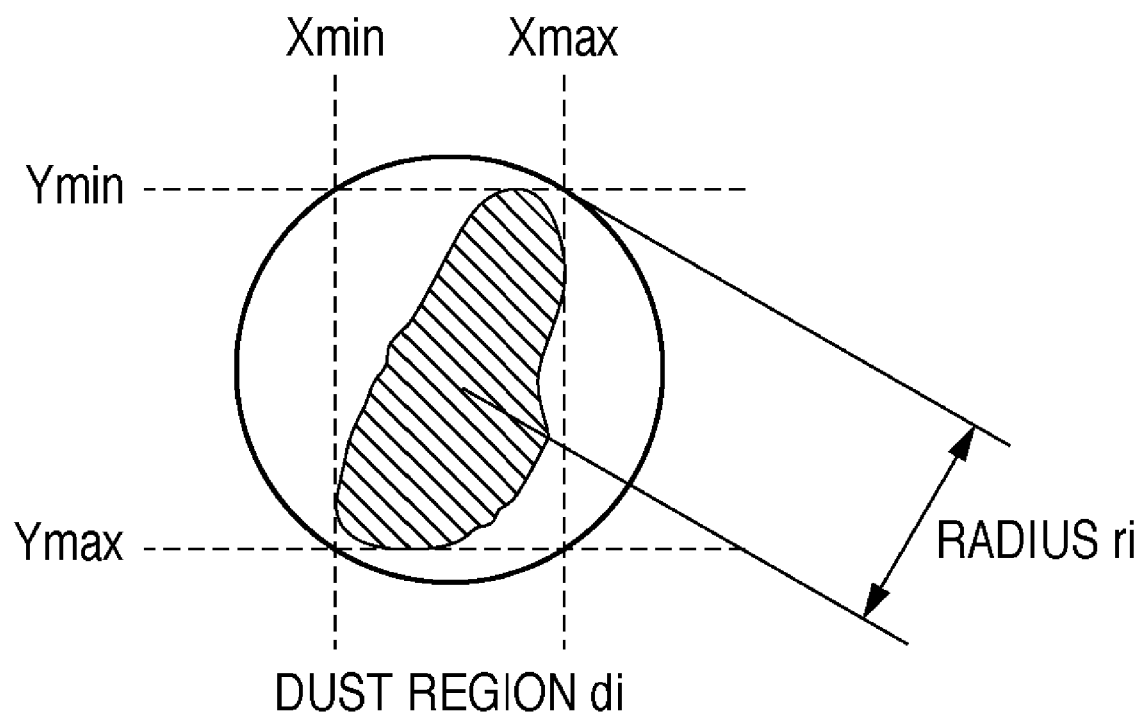
FIG. 5 is a diagram schematically showing dust region size calculation.

FIG. 5 is a diagram schematically showing dust region size calculation. As shown in FIG. 5, for each dust region, a maximum value Xmax and minimum value Xmin of coordinates of pixels configuring a dust region in the horizontal direction and a maximum value Ymax and minimum value Ymin of coordinates of such pixels in the vertical direction are obtained, and a radius ri indicating the size of a dust region di is calculated using the following equation.

$$ri = [\sqrt{\{(Xmax-Xmin)^2 + (Ymax-Ymin)^2\}}]/2$$

Further, the central coordinates (Xdi, Ydi) at this time are approximately obtained using:

$$Xdi = (Xmax + Xmin)/2$$

$$Ydi = (Ymax + Ymin)/2$$

The position (coordinates) and the radius obtained in this way are recorded as a dust information profile.

There are cases in which the data size of dust correction data (a dust information profile) is limited due to limits on the size of the nonvolatile memory 56 or the like. In order to handle such cases, the pieces of dust position information are sorted based on the size or average luminance value of a dust region. In the present embodiment, the pieces of information are sorted in order from a larger ri. When radiuses ri are the same, the pieces of information are sorted in order from a lower average luminance value. In this way, noticeable dust can be preferentially registered in the dust correction data. Note that a dust region that has been sorted is Di, and the radius of a dust region Di is Ri.

Note that when there is a dust region whose size is larger than the predetermined size, such a region may be handled by disposing it at the end of the list of sorted dust regions, rather than including that region in the sorting. For large dust regions, if interpolation processing is performed early, image quality may be contrarily degraded; thus, such a region is preferably treated so as to be at the bottom of the priority order of the correction targets.

The dust information profile is configured as shown in FIG. 6. As shown in FIG. 6, lens information and dust position/size information when an image for dust detection is shot is stored in the dust information profile. More specifically, as lens information when an image for dust detection is shot, the actual aperture value (F value) when an image for dust detection is shot, and the lens pupil position at that time are stored. Subsequently, the number of detected dust regions (an integer value) is stored in a storage region and, thereafter, the specific parameters of each dust region are stored by repeating the processing for the number of dust regions. Parameters of a dust region include a set of three numeric values of the radius of dust (for example, two bytes), an X coordinate (for example, two bytes) that is in the center of an effective image region and, similarly, a y coordinate (for example, two bytes) that is in the center.

The acquired dust information is stored in the nonvolatile memory 56 in step S208, and processing for acquiring dust information ends.

Note that a shooting operation in the dust information acquisition mode is performed in order to acquire dust information; thus, in the present embodiment, compression and processing for recording in the recording medium 200 are not performed on the shot images themselves. Although this is done to avoid wastefully filling the recording medium 200 with image data not needed by the shooter, the data may be saved in the recording medium 200 after compression as with normal images; furthermore, various changes, such changing the extension, may be made at this time.

Next, a method for acquiring dust information for moving image shooting that is information regarding the position or the size of dust on the optical element 14a, such as a low-pass filter or a cover glass disposed in front of the image sensor, shall be described assuming an image sensing apparatus configured as described above.

In the present embodiment, as when generating dust information for still images, an image for dust detection for obtaining dust information (foreign substance information) that is information regarding the position at which dust (a foreign substance) adheres, the size thereof, and the like, is shot, dust data is extracted, and dust data is generated.

Figure 7:
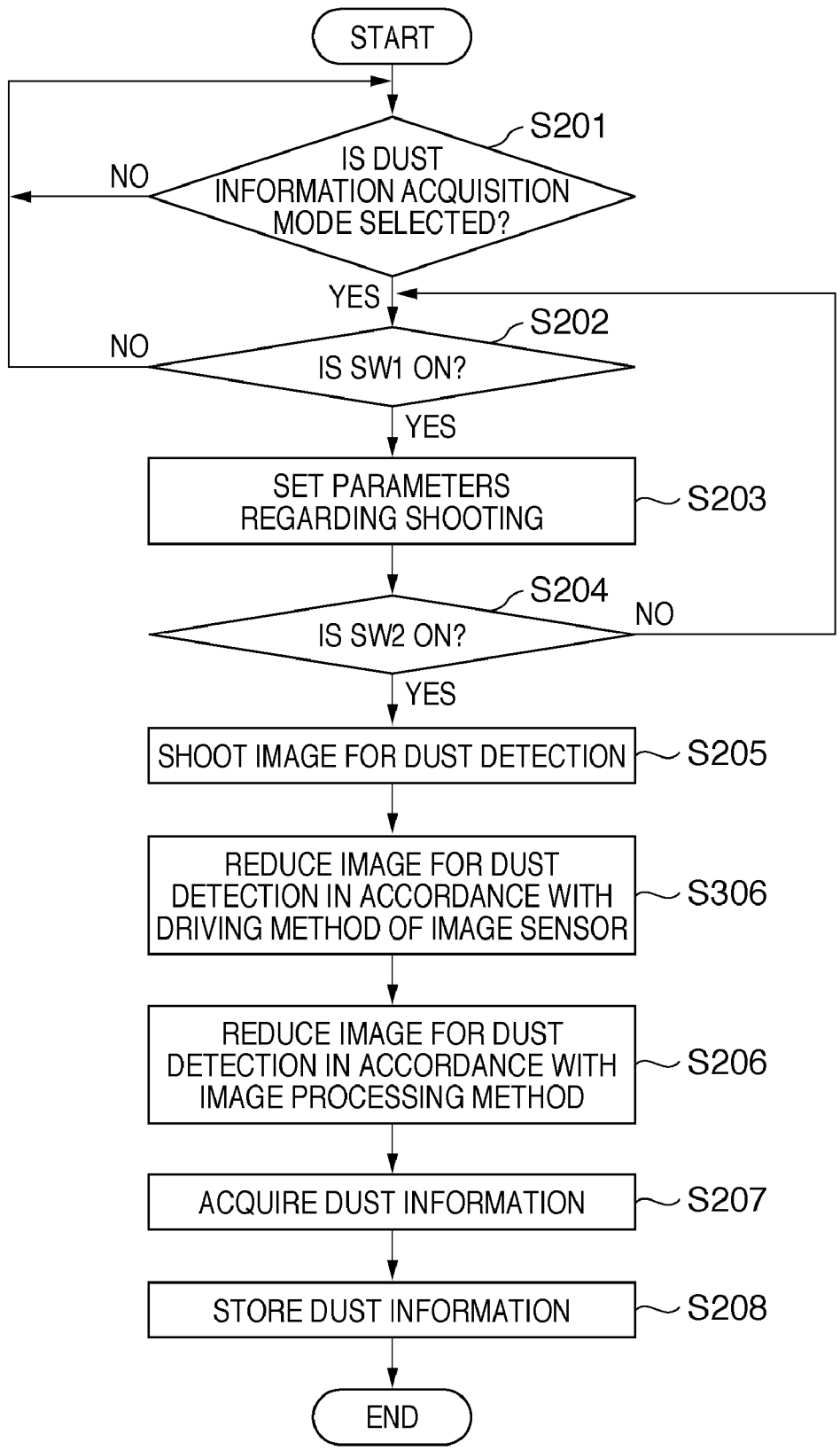
FIG. 7 is a flowchart showing processing performed by a digital camera when dust information is acquired in an embodiment of the present invention.

FIG. 7 is a flowchart showing processing performed by the digital camera when dust information for a moving image is acquired in the present embodiment. Note that although FIG. 7 shows a step in which an image for dust detection is shot again for a moving image, the operations in steps S201 to step S205 are in reality similar to the case of a still image, and an image for dust detection is not shot anew for a moving image; rather, the image for dust detection for a still image that was obtained in step S205 in FIG. 2 and has already been stored in the memory 30 is used as-is as the image for dust detection for a moving image.

Then, in step S306, reduction processing based on the driving method of the image sensor is performed on image data for dust detection stored in the memory 30, and the data is stored in the memory 30. When shooting a moving image in a normal mode, the amount of image data to be read out from the image sensor is reduced so that the image sensor is driven such that the readout time is shortened in order to maintain a predetermined frame rate. Accordingly, reduction processing in accordance with a driving method of the image sensor when shooting a normal moving image is necessary even when dust information is generated.

A driving method with which image data (the amount of data) to be read out from the image sensor is reduced shall be described with reference to FIG. 8.

Figure 8:
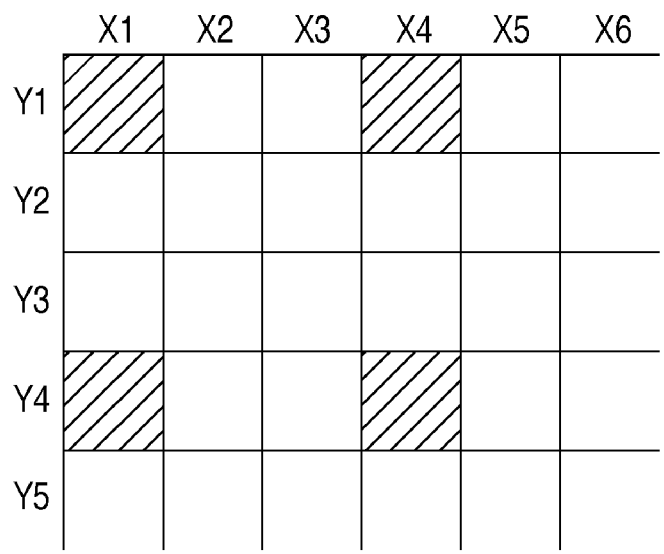
FIG. 8 is a diagram schematically showing a driving method of an image sensor.

FIG. 8 is a diagram showing an enlarged view of part of the image sensor, where numbers from X1 to X6, indicating the row direction, are provided to pixels in order to give descriptions in an easily comprehensible manner. Similarly, numbers from Y1 to Y5 are provided in the column direction as well. First, when image data is read out from the image sensor, since the image data is read out from each column, a readout method with which the amount of image data is reduced is conducted when one column's worth of image data is read out. FIG. 8 shows decimation readout in which only one pixel's worth of image data is read out for every three pixels. Accordingly, the pixels to be read out are X1, X4, and so on. Also, similarly, a readout method with which the amount of image data is reduced is conducted in the column direction as well. FIG. 8 shows decimation readout in which only one column is read out for every three columns. Thus, the columns to be read out are Y1, Y4, and so on. Therefore, in FIG. 8, the pixels that are actually read out are (X1, Y1), (X4, Y1), (X1, Y4), and (X4, Y4), and are hatched in the drawing. Since 1/9 of the original number of pixels of the image sensor are read out, this enables the readout time to be reduced.

Figure 9:
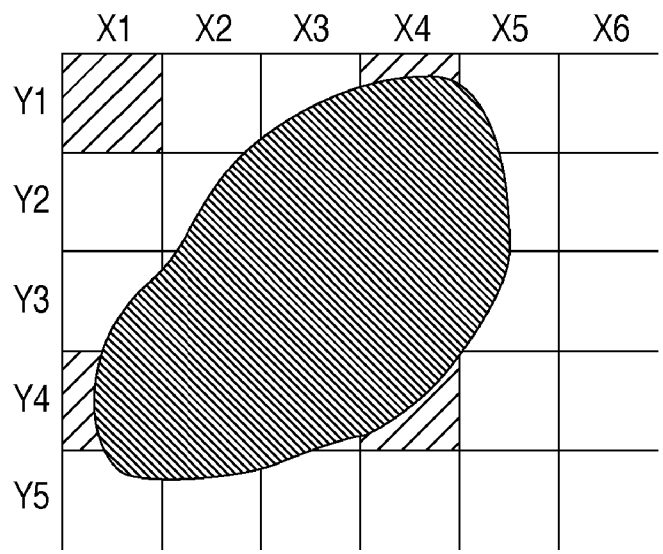
FIG. 9 is a diagram showing dust on an image sensor.
Figure 10:
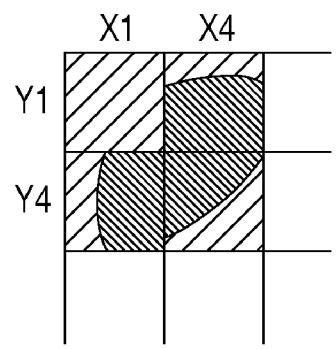
FIG. 10 is a diagram showing dust in image data.

Referring back to step S306, by conducting a driving method of the image sensor for shooting a moving image as described above, a dust portion that exists in pixels that are not read out does not exist as image data, and the dust portion is read out as image data in which the shape of the dust is different from the shape of the actual dust. Also, with small dust, the dust portion may not remain in image data, or the darkness of the shadow that dust appears as may be changed. For example, with the image sensor to which dust adheres shown in FIG. 9, since only the hatched portion of image data is read out when decimation readout is performed, the data becomes as shown in FIG. 10, which shows the shape of the dust being changed. Therefore, based on the driving method of the image sensor, information regarding a dust portion that is in pixels that are not read out is deleted from image data including an image for dust detection stored in the memory 30, thus creating a dust information acquisition image with high accuracy for moving image shooting.

Next, in step S206, reduction processing in accordance with the image processing method is performed on the image data stored in the memory 30, and the obtained data is stored in the memory 30. The size of the image to be actually recorded does not correspond to the size of the image reduced based on the driving method of the image sensor; instead, the image processing circuit performs reduction processing on the image so as to reduce the image to a VGA size, a high-definition size, or the like, so that the size of the image is converted into the size at which the image is to be recorded. Thus, reduction processing is performed on image data stored in the memory 30 using the same image processing method as that for an image recorded as a normal moving image. When shooting a moving image, if it takes time to perform reduction processing, a problem in which the time for recording a moving image is shortened occurs. In addition, since confirmation of focus and the like are not carefully evaluated as in the case of a still image, reduction processing in which time for reduction processing is relatively short is selected. The nearest neighbor method or the bilinear method is often used as the image processing method when shooting a moving image. By performing reduction processing in accordance with the image processing method, the image data on which reduction processing has been performed becomes a dust information acquisition image with high accuracy for moving image shooting.

Next, in step S207, dust information is acquired from image data for dust detection on which reduction processing has been performed and that is stored in the memory 30.

The operation for acquiring dust information in step S207 and the operation in step S208 are the same as the operations in step S207 and step S208 in FIG. 2; thus descriptions thereof is omitted.

Note that in the present embodiment, although decimation processing is performed as reduction processing for a moving image so that the number of pixels are reduced to 1/3 in each row and column, the degree of decimation differs depending on the image sensor and the frame rate to be realized. Further, there also is a case in which pixels in rows and columns are decimated differently. Further, a method for reducing image data to be read out not by simply decimating, but by obtaining an average value using a plurality of data pieces of pixels whose color is the same, and using the value as data for one pixel, may be applied.

When the size at which the image is to be recorded can be selected, the reduction method or reduction rate changes depending on an image processing apparatus, and therefore dust information may be divided and acquired based thereupon.

When a shot image is displayed in a display apparatus, if the display apparatus is different, the size of an image that is expanded in the image display memory is changed according to the display apparatus. At this time, since the reduction method or reduction rate according to the image processing apparatus is changed, dust information may be divided and acquired according thereto.

Next, when performing normal shooting, rather than shooting an image for dust detection, an operation for removing dust, by performing image processing, from normal shooting image data that has been shot shall be described.

Although dust is removed from moving image data that has been shot in the present embodiment, if each frame of a moving image is taken as a single still image, it is possible to perform processing similar to that for removing dust from a still image. Thus, the processing for removing dust in the case of a still image shall be described below.

When performing normal shooting (a still image) rather than shooting an image for dust detection, the camera setting values used when performing normal shooting, dust information (a dust information profile) such as that shown in FIG. 6, and so on are associated with image data, and the data is recorded in the recording medium 200.

Specifically, for example, dust correction data is added to an Exif region that is a header region of an image file in which camera setting values used when shooting and the like are recorded, which enables the stated association to be realized. Note that when a moving image is shot with the image sensing apparatus in the present embodiment, moving image data is recorded, for example, in the MP4 file format. In this case, a dust information profile once recorded in the nonvolatile memory 56 is stored in an mvhd box configured of header information in an moov box of moving image data, or in an mvhd box in an moof box. Consequently, dust information can be added to moving image data shot by the image sensing apparatus.

Figure 11:
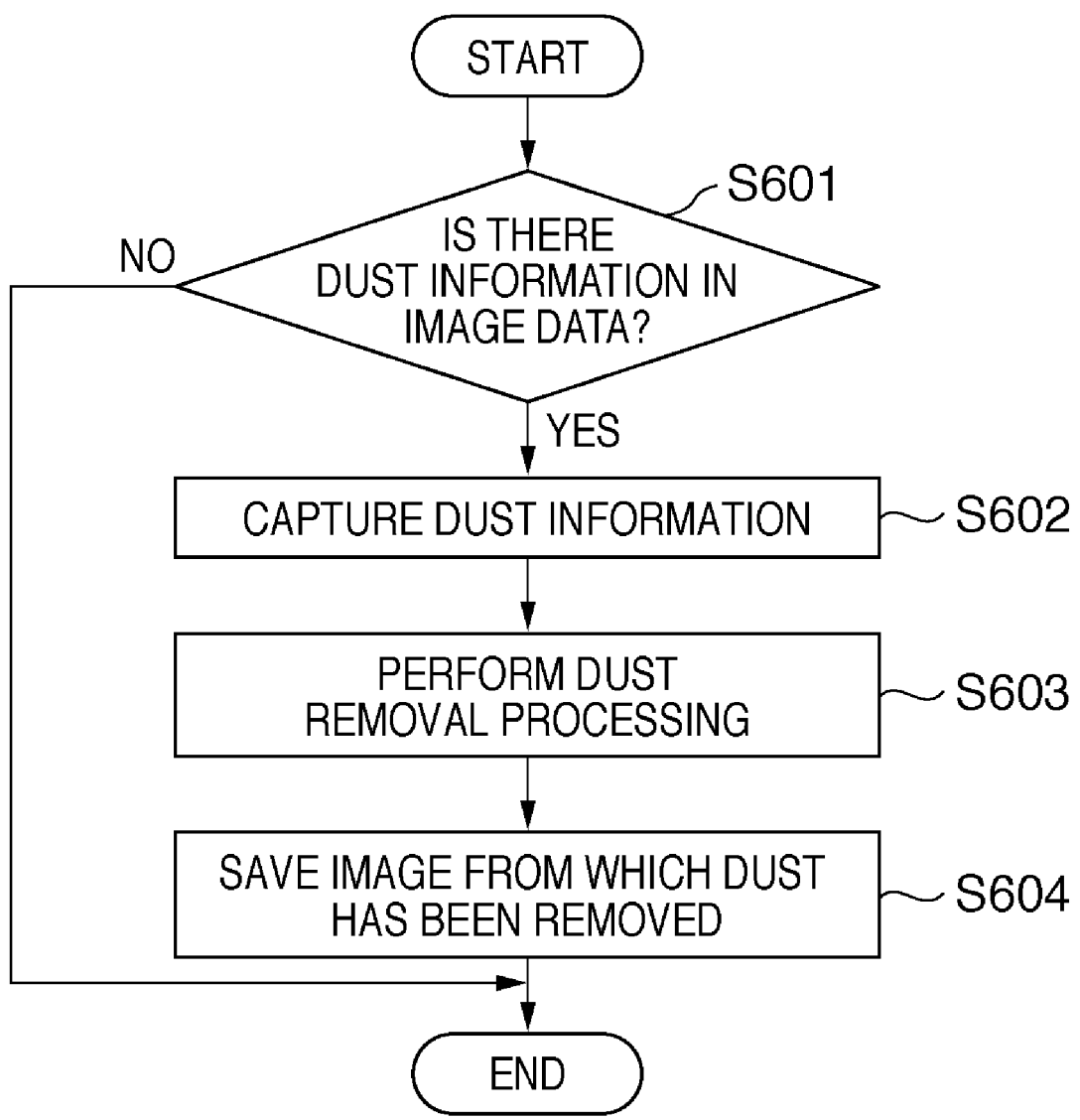
FIG. 11 is a flowchart showing dust correction in image data in an embodiment of the present invention.

Next, an operation for performing dust removal processing will be described with reference to FIG. 11.

In step S601, it is determined whether or not dust information has been embedded in the selected image data. When such information is embedded, the processing proceeds to step S602, and dust information is captured. In step S603, in order to remove the effects of dust on the image data based on captured dust information, correction processing is performed through pixel interpolation processing using the pixels around the dust, and so on.

From extracted dust correction data, a coordinate column $D_i$ ($i=1, 2$, and so on up to n), a radius column $R_i$ ($i=1, 2$, and so on up to n), an aperture value f1, and a lens pupil position L1 are obtained. Here, $R_i$ indicates the size of dust present in a dust region $D_i$ obtained when the dust correction data was sorted earlier. Further, f1 is an aperture value of the lens when shooting the image for dust detection and, similarly, L1 is a lens pupil position when shooting the image for dust detection. An aperture value f2 and a lens pupil position L2 when shooting an image that is normally shot are acquired, and $D_i$ is converted using the following equation. Here, d is the distance between the center of the image and coordinates $D_i$, and H is the distance between the surface of the image sensor 14 and the dust. Coordinates $D_i'$ obtained by the conversion and a radius $R_i'$ obtained by the conversion are defined, for example, by the following equations.

$$D_i'(x,y) = (L2 \times (L1-H) \times d/((L2-H) \times L1)) \times D_i(x,y)$$

$$R_i' = (R_i \times f1/f2 + 3) \quad (1)$$

The unit used here is the pixel, and "+3" for $R_i'$ is the margin amount.

Dust is detected in a region indicated by the coordinates $D_i'$ and a radius $R_i'$, and interpolation processing is applied as necessary. Dust removal processing is applied to all the coordinates, and when processing on all the coordinates is completed, the processing proceeds to step S604.

In step S604, the image on which correction processing has been performed in order to remove the effects of dust from the image that was shot is recorded anew.

This is the end of dust removal processing.

As described above, according to the present embodiment, foreign substance information is generated for still image shooting and moving image shooting respectively; thus, foreign substance information suitable for the shooting method can be generated and, accordingly, optimal dust removal can be realized.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-249132, filed Sep. 26, 2008, which is hereby incorporated by reference herein in its entirety.

What is claimed is:

1. An image sensing apparatus, comprising:
   an image sensor;
   an optical element disposed in front of the image sensor; and
   a foreign substance information generation unit that generates foreign substance information for a still image from a foreign substance image obtained by sensing a foreign substance that adheres to the optical element with the image sensor, and generates foreign substance information for a moving image by performing reduction processing on the foreign substance image in accordance with the driving method of the image sensor and performing reduction processing on the image processed by said reduction process in accordance with the image processing method for moving image recording when shooting a moving image.

2. The image sensing apparatus according to claim 1, wherein the driving method is decimation readout and, the reduction processing is performed in accordance with the pixels obtained by the decimation readout.

3. The image sensing apparatus according to claim 1, wherein an interpolation method for generating the foreign substance information for the still image is different from an interpolation method for generating the foreign substance information for the moving image.

4. A method for controlling an image sensing apparatus including an image sensor and an optical element disposed in front of the image sensor, the method comprising the steps of:
   generating foreign substance information for a still image from a foreign substance image obtained by sensing a foreign substance that adheres to the optical element with the image sensor; and
   generating foreign substance information for a moving image by performing reduction processing on the foreign substance image in accordance with the driving method of the image sensor and performing reduction processing on the image processed by said reduction process in accordance with the image processing method for moving image recording when shooting a moving image.

* * * * *